United States Patent [19]

Dartois et al.

[11] Patent Number: 5,050,065
[45] Date of Patent: Sep. 17, 1991

[54] RECONFIGURABLE MULTIPROCESSOR MACHINE FOR SIGNAL PROCESSING

[75] Inventors: Luc Dartois, Colombes; Eric Lenormand, Asnieres, both of France

[73] Assignee: Thomson-CSF, Puteaux, France

[21] Appl. No.: 266,147

[22] Filed: Nov. 2, 1988

[30] Foreign Application Priority Data

Nov. 6, 1987 [FR] France ............... 87 15420

[51] Int. Cl.[5] ........................................... G06F 15/16
[52] U.S. Cl. ............................ 364/200; 364/237.8; 364/229.2; 364/229.3
[58] Field of Search ... 364/131, 133, 137, 200 MS File, 364/900 MS File

[56] References Cited

U.S. PATENT DOCUMENTS

| | | | |
|---|---|---|---|
| 4,096,566 | 6/1978 | Borie et al. | 364/200 |
| 4,137,562 | 1/1979 | Boeck et al. | 364/200 |
| 4,241,411 | 12/1980 | Krasner et al. | 364/726 |
| 4,644,461 | 2/1987 | Jennings | 364/200 |
| 4,672,530 | 6/1987 | Schuss | 364/133 |
| 4,675,803 | 6/1987 | Kendall et al. | 364/200 |
| 4,884,204 | 11/1989 | Seibt et al. | 364/133 |

FOREIGN PATENT DOCUMENTS

| | | |
|---|---|---|
| 147857 | 7/1985 | European Pat. Off. . |
| 236762 | 9/1987 | European Pat. Off. . |
| 2157860 | 10/1985 | United Kingdom . |

OTHER PUBLICATIONS

Electronique et Appl. Indust. No. 284, May 1980, pp. 39–42; P. Schwartz.
Patent Abstracts of Japan, vol. 8, No. 105 (P-274) [1524], May 17, 1984.
IEEE Transactions on Industrial Electronics, vol. IE-29, No. 3, Aug. 1982, pp. 202–206; J. Tenenbaum et al.

Primary Examiner—Michael R. Fleming
Assistant Examiner—Debra A. Chun
Attorney, Agent, or Firm—Oblon, Spivak, McClelland, Maier & Neustadt

[57] ABSTRACT

In a multiprocessor machine comprising K channels of different signals, the signals are converted to digital samples by K analog-to-digital converters connected respectively to each channel. N monolithic elementary processors are connected by means of a sample acquisition bus which is common to all of the K analog-to-digital converters. They are also connected by a ring bus which is common to all of the processors so as to permit circulation between processors of the results of computation performed on the samples received by each processor. A control unit and at least one transfer automat synchronized by a common clock signal initiate respectively on the one hand the performance of computations to be carried out by the processors on the samples which they receive as well as on the other hand the transfer of samples on the acquisition bus and the transfer of the results of computation between processors on the ring bus.

6 Claims, 7 Drawing Sheets

FIG_1

FIG.2

FIG_3

FIG.5

FIG_6-A

FIG_6-B

RECONFIGURABLE MULTIPROCESSOR MACHINE FOR SIGNAL PROCESSING

BACKGROUND OF THE INVENTION

1. Field of the Invention

The present invention relates to a reconfigurable multiprocessor machine for signal processing.

The invention is primarily applicable to the construction of radioelectric receivers, radiogoniometers, radars or sonars and in a general manner to all devices for signal-processing in which the performance of processing operations calls for high computing power with a high degree of parallelism in the algorithms.

2. Description of the Prior Art

In known multiprocessor machines for signal processing, the computing powers employed depend on the algorithms, on the types of processing operations and on the number of lines of the signal spectrum. At the present time, these powers vary typically from one to a few hundred million operations per second. Depending on the applications which are contemplated, the number of receiving channels of the receivers or of the sensors employed for acquisition of the signals can vary between a few units and a few hundreds of units and the passbands are of greater or lesser widths as a function of the outputs which can amount to several tens of millions of samples per second.

In many applications, the output is continuous and must be processed in real time as the samples arrive, on the one hand because the available memory volume is limited and on the other hand in order to avoid any loss of information.

Moreover, certain applications such as those relating to alarm detections in goniometers impose a short response time between the moment at which the information enters the machine and the moment at which the results are available.

In the majority of applications mentioned above, the greater part of the processing operations performed has a repetitive character in time or in other words the same tasks are repeated at intervals. Some of these processing operations have shorter recurrences than others whereas others have different symmetries.

All these characteristics lead equipment designers to define particular structures which are more or less well-suited to a particular type of processing operation.

Among these structures, there exist those which are designated by the abbreviation MIMD, or "Multiple Instruction Multiple Data" and those known by the abbreviation SIMD, or "Single Instruction Multiple Data". The MIMD structure which makes it possible to carry out different instructions during the same machine cycle is in most general use since all types of problems may thus be dealt with. This structure is constituted by a number of processors having their own sequencers. Each processor is usually dedicated to one type of processing operation and all processing operations performed by all the processors are chained. In consequence, any major modification of the processing chain is liable to involve the entire structural design of the multiprocessor system. Furthermore, if the chain has feedback loops, these latter gives rise to synchronization difficulties which complicate the design development of the logic system.

Moreover, a structure of this type, which is often employed in the so-called "pipeline" mode in which the data pass on a common bus to the processors and are processed successively by the processors, may exhibit a substantial response time.

The SIMD structure, which makes it possible to carry out a single program in simultaneity on each processor on data which are characteristic of each of these latter, is much more homogeneous and uniform but presupposes that the processing operations are also homogeneous and uniform and have various symmetries. One of the major disadvantages results from the fact that the same instruction must be carried out exactly at the same instant in each operator. In consequence, it is impossible to carry out the processing operations, even when they differ very little from each other, on the different components of a vector without substantially reducing the efficiency of the machine.

In regard to data exchanges, an improvement has been made in the SIMD structures with a view to endowing them with the advantages of the MIMD structures and to optimizing the memory occupations but solely in respect of processing operations which have "temporal symmetry". By way of example, a corresponding device is described in French patent Application No. 83 15649.

However, all types of SIMD machines are subject to the disadvantage of having one or a number of bulky and complex sequencing elements which are often difficult to program and are lacking in speed for chaining and synchronization of the tasks to be performed.

In order to make a signal-processing machine more flexible and more adaptable, it would be necessary to ensure not only that it is capable of receiving the different types of processing operation with good efficiency but also that it does not produce any stoppage at the level of the data streams. The machine should therefore be capable of dynamically reconfiguring its data streams, namely both its input streams and those concerned with current tasks.

SUMMARY OF THE INVENTION

The object of the invention is to overcome the disadvantages outlined in the foregoing.

To this end, the invention relates to a reconfigurable multiprocessor machine for signal processing of the type in which the analog signals to be processed are received from K different signal channels and converted to the form of digital samples by K analog-to-digital converters connected respectively to each channel. Said machine is distinguished by the fact that it comprises on the one hand N monolithic elementary signal processors connected by means of a sample acquisition bus common to all of the N processors, to the K sample outputs of the K analog-to-digital converters and also connected by a ring bus common to all of the N processors so as to permit circulation between processors of the results of computation performed on the samples received by each processor and, on the other hand, a control unit and at least one transfer automat synchronized by a common clock signal for controlling respectively on the one hand the performance of computations to be carried out by the processors on the samples which they receive as well as on the other hand the transfer of samples on the acquisition bus and the transfer of results of computation between processors on the ring bus.

The main advantage of the invention is that it permits transfers of data and computations in a simultaneous manner by virtue of the separation of the respective sequencing elements. A higher degree of efficiency is thus obtained. It also has the advantages of leading to simple designs of each processor. Another advantage is that the machine proposed can be constructed around a single type of processor known as an elementary processor employed (n+2) times, two processors being dedicated to management and to sequencing of the machine whilst the n other processors constitute the reconfigurable structure. This structure also permits operation of the machine in the SIMD mode or in the MIMD mode.

A further advantage is that sequencing of computations is ensured by means of only two processors. In consequence, sequencing of data transfers is totally independent and presents no problem of sharing of common resources with the computing processors by virtue of the fact that the transfers are managed by two programmable automats which are practically independent. The machine can thus advantageously be perceived by users as being composed of three virtual processors, two processors being specialized for transfers and one processor being reserved for computations, the transfers being each performed on an independent bus and simultaneously with a computation task. The fact that each processor is connected to the two transfer buses provides maximum flexibility for exchanges of data.

The characteristic feature of the two types of transfer lies in the possibility of defining for each independent bus the information source or sources and the destination or destinations at each machine cycle, one of the two buses being reserved for acquisition of samples and the second or ring bus being reserved for data transported between processors and on the input-output interfaces. By distributing the memory access sub-cycles relative to the computation and transfer tasks, the memory interface means enable each machine cycle to overcome problems of conflict at the time of memory accesses. Thus the computation and transfer processors operate with the same basic cycles in a synchronous manner.

The result is that there is obtained an optimum mode of operation of the machine in which three tasks can be initiated simultaneously. These tasks can be broken up into a task of transfer on each of the two buses and a task of computation in the SIMD or MIMD mode, the three tasks being performed in parallel without any conflicts between computation and transfers and each having the same time duration. The processing operation can then be followed by another triplet of tasks and extraction of a triplet of tasks takes place in a few machine cycles under the control of one of the elementary processors.

Naturally, at each activation of a computation task, the machine can be reconfigured without any waste of time either in the SIMD mode or in the MIMD mode and the data transfers can be reconfigured at any moment in different sub-groups on the elementary processors.

DETAILED DESCRIPTION OF THE INVENTION

Figure 1:
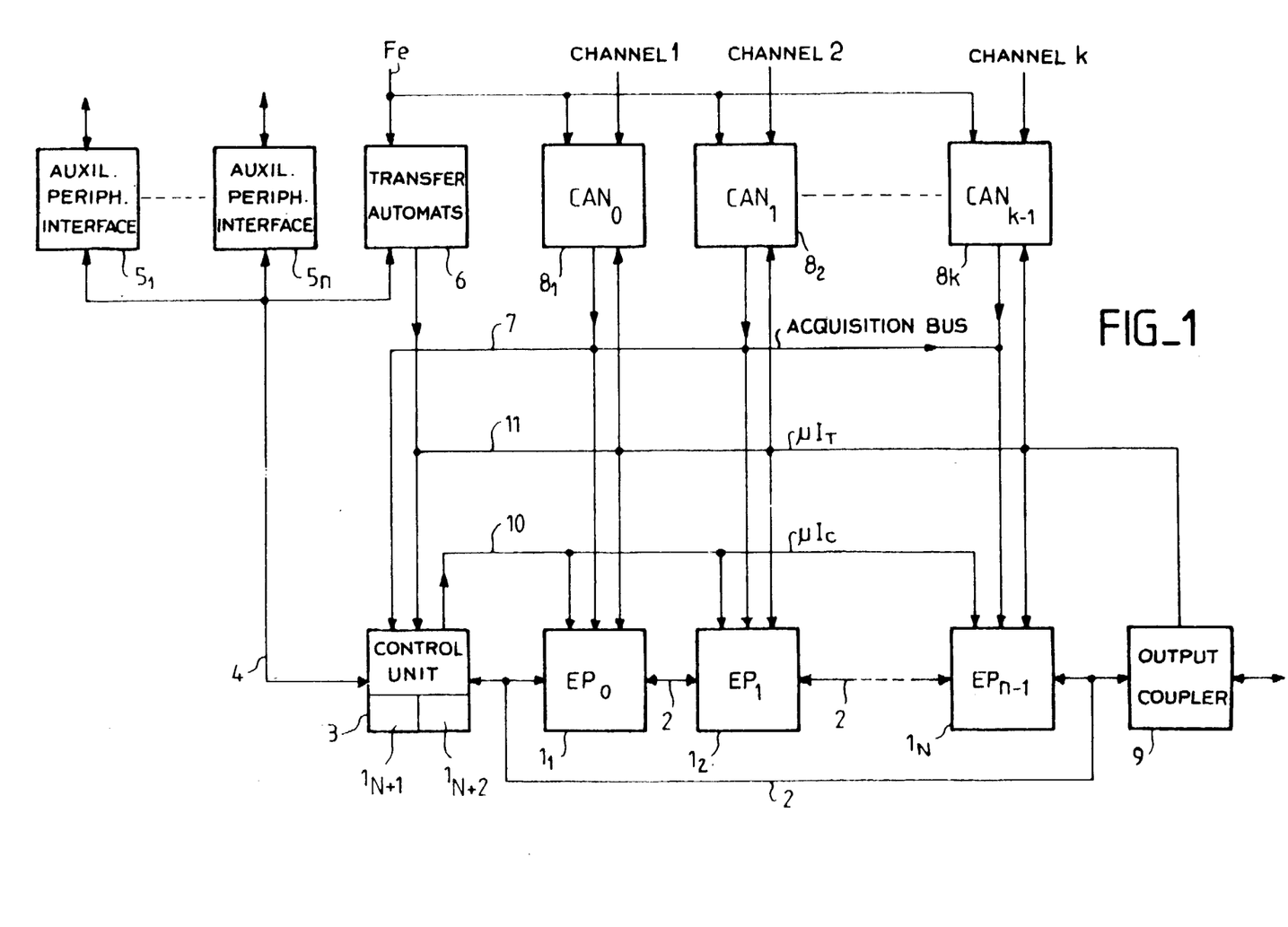
FIG. 1 is a general block diagram of a multiprocessor machine in accordance with the invention.

The general structure of one embodiment of the machine is given in FIG. 1 and is constituted by $N+2$ elementary signal-processing processors designated by the references $1_1$ to $1_{N+2}$, where N is any natural integer. These processors have identical basic structures. N processors numbered from $1_1$ to $1_N$ constitute the operative portion of the machine. They are connected to each other by a ring bus 2 so as to permit exchanges of interprocessor data during processing.

The last two processors $1_{N+1}$, $1_{N+2}$ are provided with additional elements and constitute the control unit 3 of the machine. The control unit 3 is connected to a peripheral bus 4 so as to permit dialogs by means of interface circuits $5_1$ to $5_L$ with auxiliary peripherals (not shown) and to control and parameterize transfer automats 6 which have the function of controlling the ordered streams on the buses of the machine.

The control unit 3 is connected to the ring bus 2 for the purpose on the one hand of parameterizing the treatments of the processors $1_1$ to $1_N$ (also known as elementary processors or slave processors) and on the other hand of collecting their results. A second data bus 7 connects k input elements $8_1$ to $8_k$ (K being any whole number) formed by analog-to-digital converters, to the $N+2$ elementary processors. In FIG. 1, the input elements are connected to k signal channels and transmit signal samples on the bus 7. This bus is unidirectional and makes it possible to supply any one of the $N+2$ elementary processors with samples of any one of the k reception channels.

A coupler 9 connected to the ring bus 2 and to the control unit 3 provides a communication between the machine and processing elements (not shown) located at the downstream end, both in order to supply the results derived from the ring bus 2 and in order to pass the parameters and application programs upstream via said bus to the control unit 3. The advantage of this multiple-bus structure is in fact to make it possible by means of the control unit 3 to diffuse data and programs to all the other elementary processors $1_1$ to $1_N$ and to the transfer automats 6. The control unit 3 generates a computation micro-instruction $\mu I_c$ to be sent to the N elementary slave processors $1_1$ to $1_N$ on the instruction bus 10. Each micro-instruction is coded in accordance with the code of micro-instructions of the elementary processors.

The transfer automats 6 generate a transfer micro-instruction $\mu I_T$ on an instruction bus 11, this micro-instruction being intended for all the other elements except the interface circuits $5_1$ to $5_L$ of the auxiliary peripherals. The function of a transfer micro-instruction $\mu I_t$ is to control activation at the level of each data-emitting element and to check at the level of each receiving element whether the datum is intended for said receiver and the location at which it is to be stored, in the case of each data bus of the machine. All the potential conflicts related to the memory accesses of the processors are resolved by the transfer automats 6. The N elementary slave processors $1_1$ to $1_N$, the output coupler 9, the control unit 3 and the transfer automats 6 are synchronized with a clock signal H emitted by an external clock (not shown) for determining the cycle of the machine. At each cycle, the N+2 processors perform one operation corresponding to transmission of a computation micro-instruction $\mu I_c$ and of an independent transfer micro-instruction $\mu I_t$.

At each cycle of the clock H, it is also possible to pass a datum on the acquisition bus 7 and a datum between two adjacent processors on the ring 2 in the case of each of the N elementary slave processors. The k analog converters $8_1$ to $8_K$ and the transfer automats 6 are synchronized by a sampling clock (not shown) having a frequency Fe. Said clock serves to synchronize the stream of entering samples and transfer of this latter to the elementary slave processors via the acquisition bus 7.

Figure 2:
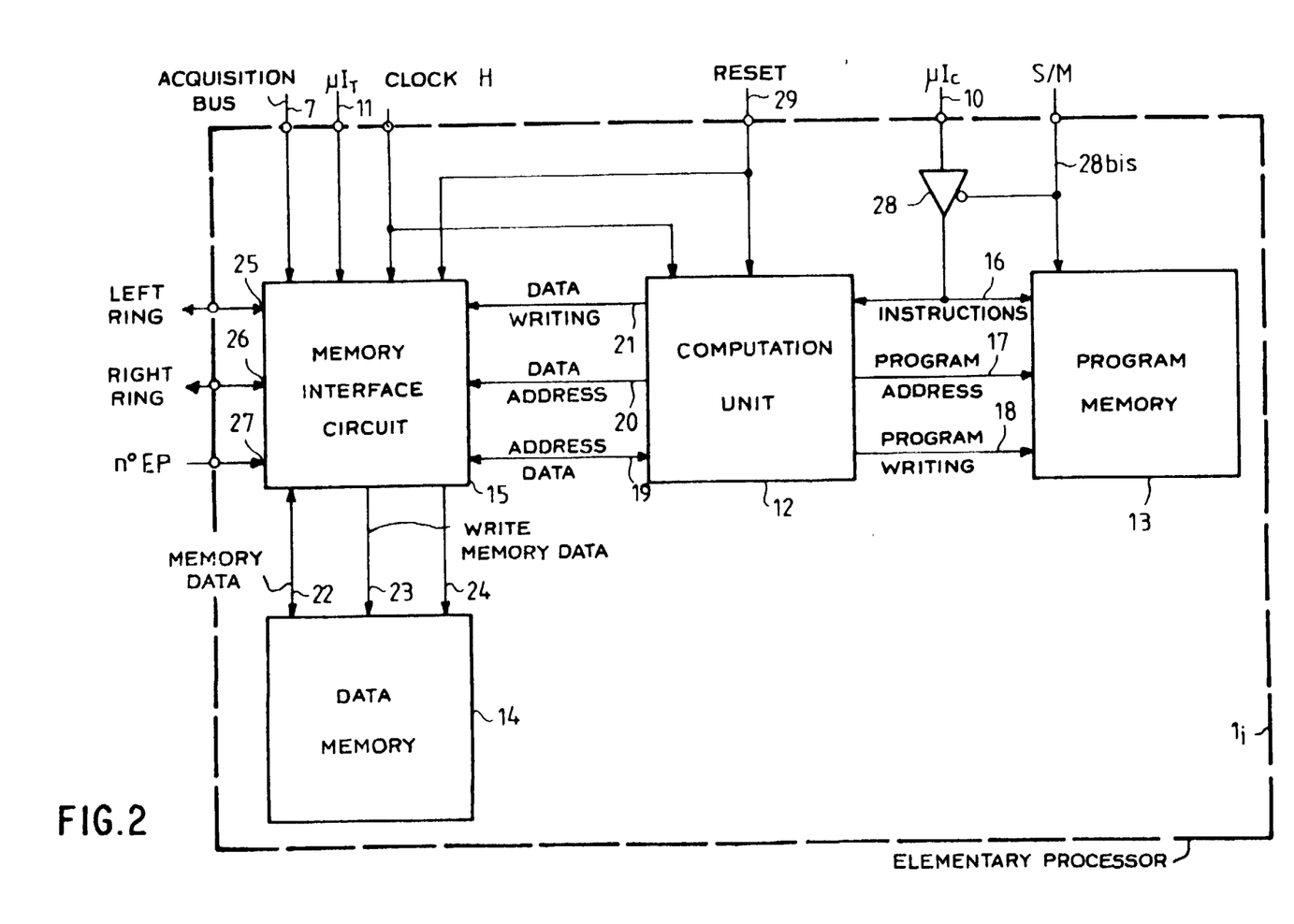
FIG. 2 is a block diagram of an elementary processor and its memory environment.

A basic structure of the processors $1_1$ to $1_N$ is shown in FIG. 2 and corresponds to a four-bus structure of the Harvard type. This has the advantage of simplifying the interface circuits and making the processor more efficient. However, in order not to limit this part of the invention to structures of the Harvard type, it will be understood that a conventional two-bus structure remains feasible.

The processor as illustrated includes a computation unit 12 formed by a microprocessor or any equivalent device coupled on the one hand to a program memory 13 and on the other hand to a data memory 14 via a memory interface circuit 15. The program memory 13 is connected to the computation unit 12 via an instruction bus 16, an address bus 17 and a program writing control line 18. The memory interface circuit 15 connects the computation unit 12 by means of a data bus 19, a data address bus 20 and a writing control line 21. The data memory 14 is connected to the memory interface circuit 15 by means of a data bus 22, an address bus 23 and a control line 24. Furthermore, the memory interface circuit 15 is connected to the acquisition bus 7 and to the bus for $\mu$ transfer micro-instructions 11. Said memory interface circuit also has two left and right connection ports 25 and 26 so as to permit insertion of the processor in the ring 2 and an identification port 27 for identifying the processor in the ring by an EP number.

A buffer register 28 provides the interface between the micro-instruction computation bus 10 and the instruction bus 16. A control line 28 bis has the function of controlling the processor in the SIMD or MIMD mode by applying a signal S/M for inhibition of the memory cycles of the program memory 13 when the processor is controlled in the SIMD mode by the pilot processor.

The memory interface circuit 15 has the function of making the sharing of the data memory 14 with the two acquisition buses 7 and the ring 2 transparent for the computation unit 12.

The computation unit 12 has the intended function of carrying out all the instructions in one clock cycle H and to present the data to be written or to request the read data always at the same instant in a cycle of the clock H. This permits the most effective use of the resources of the data memory 14 by the memory interface circuit 15. The memory 14 has a reaction time of less than a half-cycle of the clock H in order that it may be employed twice per cycle, namely once for the computation unit 12 and once for one of the transfer buses 2 or 7. Under these conditions, the memory interface circuit 13 is synchronous with the computation unit 12 and receives the same basic clock H. Initial synchronization of the memory interface circuit 15 and of the computation unit 12 is obtained by application of a "reset" signal for initialization by means of a connection 29.

Figure 3:
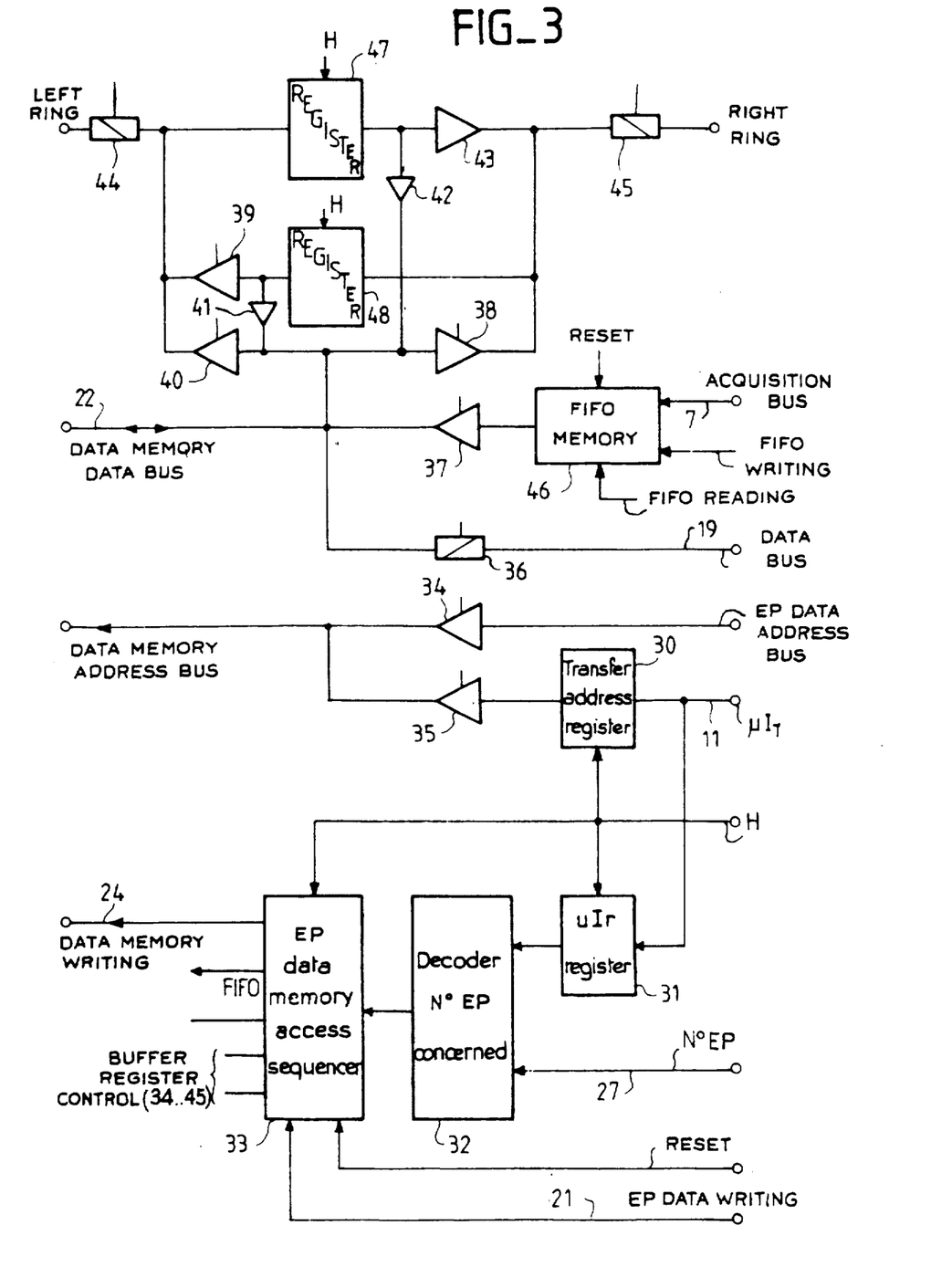
FIG. 3 illustrates an example of the memory interface circuit for an elementary processor in accordance with the invention.

One example of construction of a memory interface circuit will now be described with reference to FIG. 3. The circuit has the function of systematically allocating the data memory 14 to the computation unit 12 for one half-cycle of the clock H and of allocating to one of the transfer buses 2 or 7 for the other half-cycle according to its activity and according to whether the associated elementary processor belongs to the groups of information sources or addressees.

To this end, the memory interface circuit 15 receives on the line 11 a transfer micro-instruction $\mu I_T$ sampled by the clock H. Said circuit contains an address portion of the memory 14 and an instruction portion, these two portions being stored in registers 30 and 31. The instruction portion is decoded by a decoding circuit 32 and may be validated by the number of the elementary processor applied on the connection 27. The result of the decoding operation is transmitted to a sequencer 33 which also receives a write-read signal via the control line 21. In the following cycle H, the sequencer 33 generates signals for controlling the buffer registers designated by the references 34 to 45 as well as the write-read signal of the data memory applied on the connection 24. It is this sequencer which manages the two sub-cycles of the data memory.

The buffer registers 34 and 35 are validated alternately so as to permit the transfer at each half-cycle H either of the address derived from the computation unit 12 or of the transfer address contained in the transfer address register 30 which is loaded for the address portion of the transfer micro-instruction applied on the line 11. A bidirectional buffer register 36 makes it possible during the half-cycle allocated to the elementary processor to validate in reading or in writing the data applied on the data bus 19.

The interface at the acquisition bus 7 is formed by means of an acquisition buffer memory 46 of the queue type also designated as "First-in First-out" (FIFO) which permits queuing of a plurality of samples derived from the analog-to-digital converters $8_1$ to $8_k$ before storing them in the memory 14.

Writing and reading of the memory 4 are controlled by the sequencer 33 from the instruction portion of the transfer micro-instruction $\mu I_T$ which is stored in the register 31. The buffer register 37 enables the memory 42 to gain access to the data bus 22 of the memory during the allocated half-cycle.

The interface with the ring bus is constituted by buffer registers 44 and 45 and by two registers, namely a left register 47 and a right register 48.

The left register 47 permits circulation of the data on the ring 2 from left to right and, conversely, the right register 48 serves to constitute the ring from right to left. The buffer registers 41 and 42 serve to write in the memory 14 of the corresponding processor the data which have circulated on the ring 2 in one direction while the ring 2 is employed in the other direction.

Buffer registers 39 and 40 are validated alternately so as to permit either injection of the contents of the memory 14 in the left portion of the ring 2 or injection of the contents of the right ring via the register 47 into the left portion of the ring or validation of the right-left circulation of the ring 2.

Buffer registers 43 and 38 perform similar functions for the other direction of circulation on the ring.

The transfers into the registers 47 and 48 are synchronous with the transfer micro-instructions $\mu I_T$, synchronization being ensured by the clock H. Bidirectional buffers 44 and 45 make it possible on the one hand to isolate the sections of ring 2 for the read and write operations and on the other hand to avoid conflicts at locations in which there are more than two subscribers on one ring section. This is the case for example with the connection of the processors $1_1$ and $1_N$ which is common with the control unit 3 and the coupler 9 in which it is essential to be able to establish a connection between coupler 9 and processor $1_{N+1}$, for example, while continuing to operate the ring in an open manner between the processors $1_1$ and $1_N$.

This interface structure makes it possible at each cycle of the clock H to produce simultaneously:
an access to the data memory 14,
a left or right shift of the ring 2,
a sample writing operation in the acquisition buffer memory 46,
writing or reading in the memory 14 in conjunction either with the acquisition buffer memory 46 or with the left portion of the ring or with its right portion.

In order to synchronize all the elementary processors, the sequencer 33 of the memory interface circuit as well as the memory 46 receive an initialization "reset" signal. This signal also makes it possible to dump the buffer memory 46.

The distribution of the acquisition memory and ring accesses is resolved generally at the level of the transfer automats 6 in the case of all the elementary processors $1_1$ to $1_{N+2}$.

Figure 4:
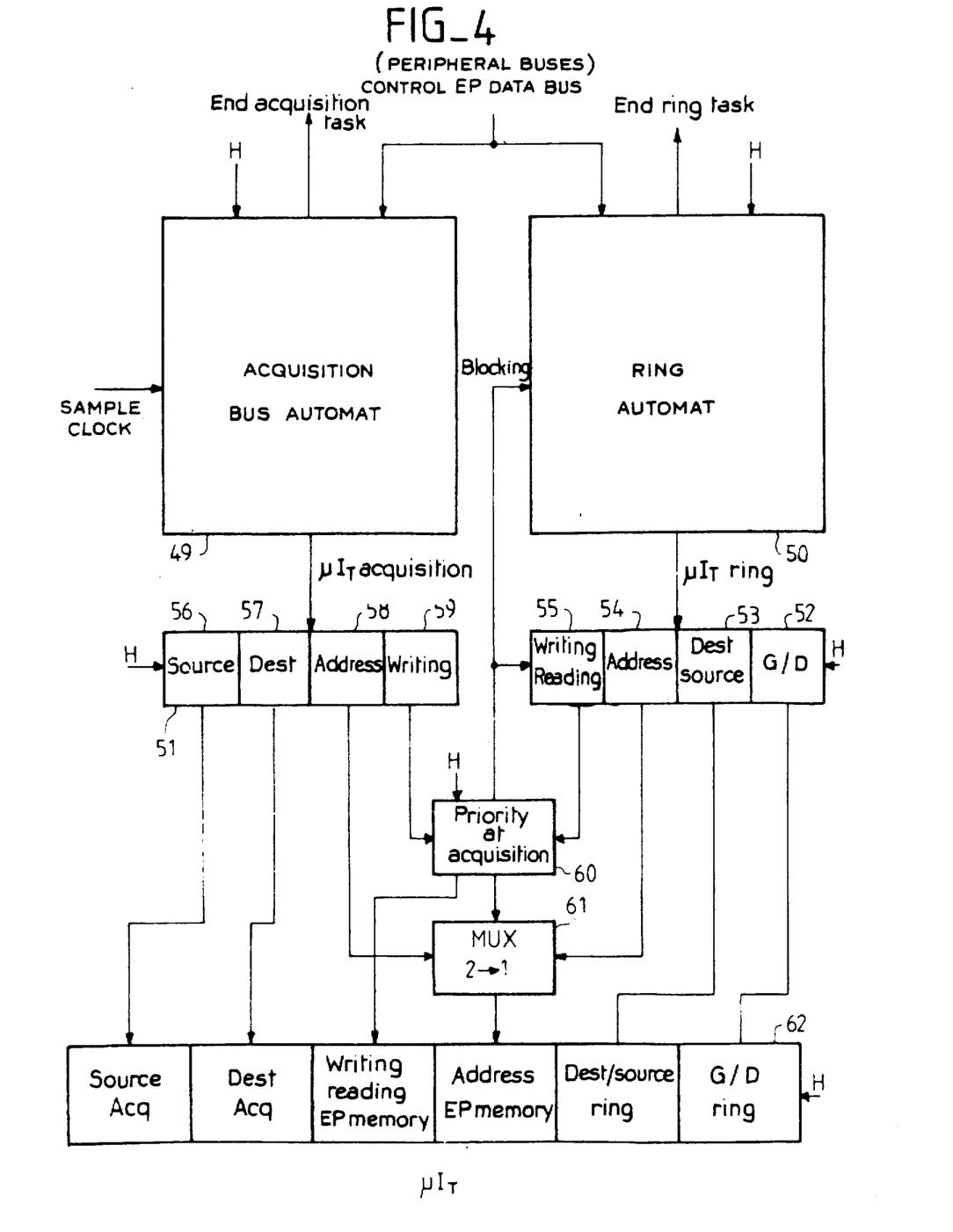
FIG. 4 is a block diagram of automats for sequencing of transfers in accordance with the invention.

The transfer automats illustrated in FIG. 4 are two in number: one automat 49 for the acquisition bust and one automat 50 for the ring 2. Each automat generates a portion of the transfer micro-instruction $\mu I_T$ and these two portions are placed next to each other in order to generate the complete microinstruction and in order to resolve conflicts of access to the memory 14.

The structures of the automats 49 and 50 are similar: each automat operates at the frequency of the clock H and generates a transfer micro-instruction on the acquisition bus 7 or on the ring 2 which is synchronized by means of an interface register 51 or 52 at the frequency of the clock H. Each transfer microinstruction contains at least four fields distributed as follows:
in the case of the ring:
  a field 52 of activity of the ring to the left or to the right,
  a field 53 for indication of the source or of the destination of the transfer according to the direction of transfer by indicating the group of elementary processors concerned,
  an address field 54 which is active at the time of a write or read operation in the memory of the elementary processor concerned,
  a write-read field 52 for indicating the type of access to the memory;
in the case of the acquisition bus:
  a source field 56 for indicating the analog-to-digital converter $8_1$ to $8_k$ employed,
  a destination field 57 for indicating the group of elementary processors concerned by the transfer,
  an address field 58 for the memory access of the elementary processor concerned,
  and a writing field 59 for indicating a write access of the elementary processor concerned.

The programs for the performance of the transfer micro-instructions on the acquisition bus 7 and ring bus 2 are independent. However, conflicts may occur between these two programs when these latter are required to gain access to a data memory 14 simultaneously. By reason of the transient appearance of the samples derived from the analog-to-digital converters $8_1$ to $8_k$ and the small size which can be achieved for the buffer memory 46 of the memory interface circuits 15, this problem is solved by giving greater priority to the accesses to the memory 14 for acquisition of a large number of samples. These latter override those of the ring by virtue of a priority circuit 60 which compares at each cycle H the memory access requests of the two automats. In the event of conflict, the priority circuit 60 gives priority to the acquisition and generates a control signal for initiating blocking of the automat 50 of the ring bus 2 during one cycle of the clock H and, by means of the same control signal, forces in known manner a "non-operation" within the register of the current micro-instruction of the automat for the current cycle. The result is a theft of cycle of the transfer to the ring 2 so as to permit acquisition of the samples derived from an analog-to-digital converter at each memory access conflict and solely in that case.

The priority circuit 60 controls a multiplexer circuit 61 which, as a function of the elected bus, chooses the access address and the type of memory access requested. The resultant transfer microinstruction $\mu I_t$ is sampled in a register 62 by the clock H before being distributed in synchronous manner to the memory interface circuit 15 of all the elementary processors.

The structure of each transfer automat 49 and 50 can indifferently be of two types. It can be obtained in known manner either from sequencer and address generator circuits or simply from a program counter and a micro-instruction memory.

The first solution makes it possible to reduce the size of the micro-program for the repetitions but limits these repetitions to prewired circuit elements.

The second solution involves a compilation on the basis of the first micro-program and said compilation generates the exhaustive list of all the microinstructions for all the cycles. This solution permits greater flexibility at the expense of memory size and results in higher speed and greater simplicity of construction. It is very well suited to high-speed applications in which the processing operations are perfectly determined but highly varied with short recurrences which consequently do not require excessive memory capacity for storage of the transfer micro-instructions. Such a case may arise, for example, in certain applications of radiogoniometry with parallel interferometry in which the recurrences are of the order of a few tens of thousands of cycles.

In the case of a design of this type, the transfer micro-instruction must contain in addition a field which indicates the end of the task. This information serves to block the program counter and to generate an end-of-task signal to be delivered to the processor $1_{N+1}$ of the control unit 3. This naturally applies to each of the two automats 49 and 50.

In order to initiate a transfer task, it is necessary and sufficient to give it the start address and to give it the starting order, which consists in pre-positioning the counter of the automat and validating its clock H which will be inhibited at the end of the task. This starting operation is carried out by the peripheral bus 4 which is also employed for remote loading and checking of the micro-instruction memories.

The sampling clock is employed by the acquisition automat for setting a repetition rate for the acquisition sub-tasks corresponding to the transfers to be effected between two synchronous sampling operations of all the reception channels.

Finally, the fields of destination of the micro-instruction for transfer on the acquisition bus and source and of destination of the micro-instruction for transfer on the ring bus 2 are independent and contain more than $|\log_2(n+2)|$ bits for permitting selection of the groups of elementary processors from among $n+2$ in addition to the conventional choice of one elementary processor from among $n+2$.

It is possible for example with $|2+\log_2(n+2)|$ bits to carry out the following selections:

1 elementary processor from among $n+2$,
all the elementary processors,
all the elementary processors in which the binary number has the $i^{th}$ bit at 1,
all the elementary processors in which the binary number has the $i^{th}$ bit at 0, (The two last-mentioned cases are very useful, for example in order to carry out exchanges between butterflies of the butterfly algorithm which is known for calculation of fast Fourier transforms)

and finally any repetitive pattern out of four elementary processors.

Figure 5:
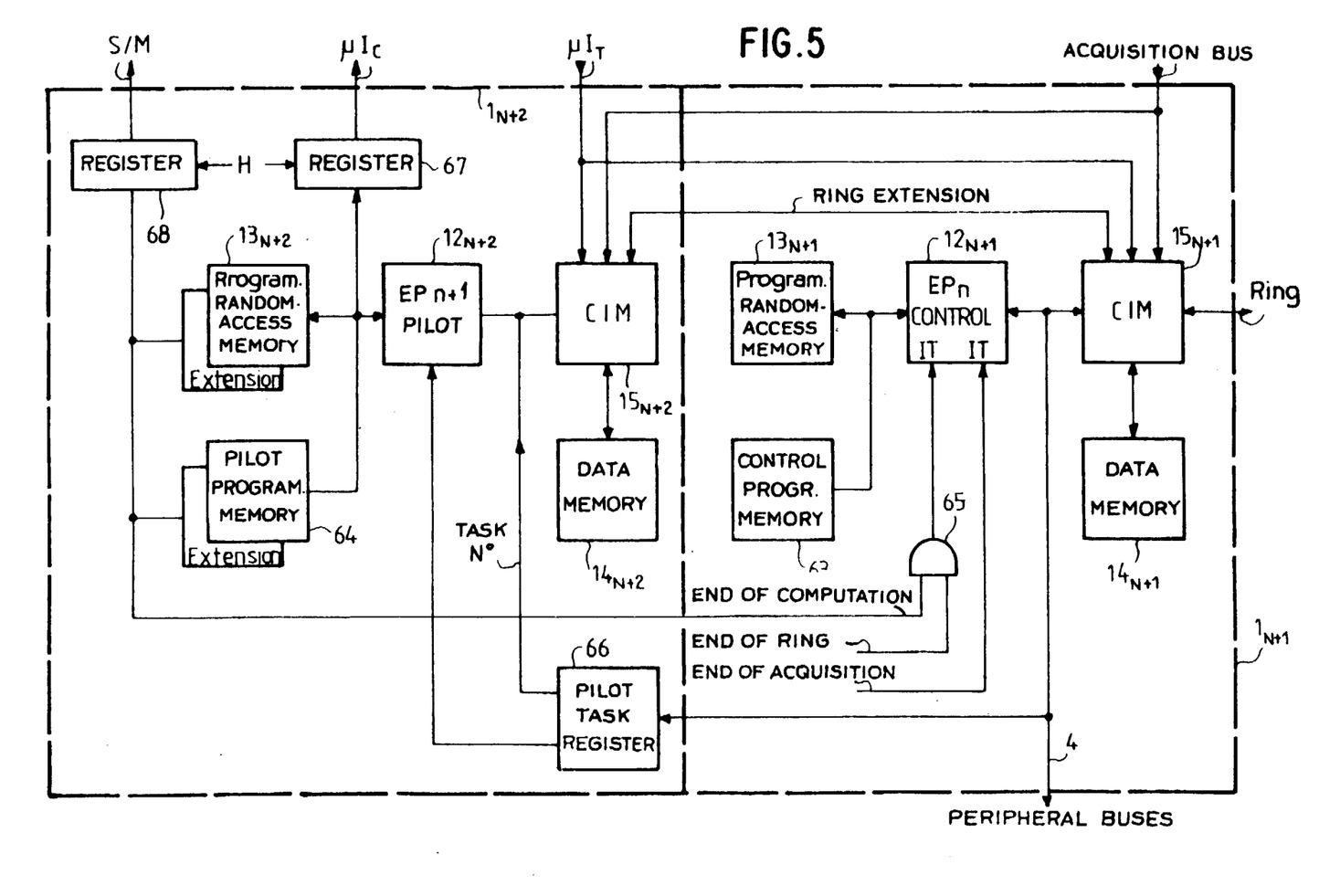
FIG. 5 is a constructional block diagram of the control processor and of the pilot processor forming the control unit of FIG. 1.

The checking and control unit 3 is illustrated in FIG. 5. This unit is constituted by elementary processors $1_{N+1}$ and $1_{N+2}$ which are shown in FIG. 5 within dashed-line rectangles. The processors $1_{N+1}$ and $1_{N+2}$ perform the function of control processor and pilot processor for all the processors of the machine. These processors have a basic structure which is similar to that of the elementary processors $1_1$ to $1_N$.

The control processor $1_{N+1}$ is connected to the ring 2 at the level of the feedback connection of this latter to the processors $1_1$ and $1_N$ by means of the right-hand portion of its memory interface circuit $15_{N+1}$. The left-hand output of the memory interface circuit $15_{N+1}$ creates an extension of the ring 2 and is connected to the right-hand portion of the memory interface circuit $15_{N+2}$ of the processor $1_{N+2}$. This connection enables the control processor $1_{N+1}$ to fill the data memory $14_{N+2}$ of the pilot elementary processor $1_{N+2}$ and indirectly its program memory $13_{N+2}$ under the control of the automats 49 and 50.

In fact, since the processors have a distinctive feature in that they are capable of writing or reading on their program-bus, it is possible in the SIMD mode for the slave processors or from a program read-only memory to transfer programs from the data memories 14 to the program memories 13.

Additional program memories 63 and 64 make it possible on the basis of a simple continuous resident program of the "bootstrap" type to completely remote-load an application (program and parameters) in the $n+2$ elementary processors as well as in the automats 49 and 50 from the single input-output coupler 9.

The program memory $13_{N+2}$ of the pilot elementary processor $1_{N+2}$ is connected to two instruction registers 67 and 68 and contains in addition an extension of its instruction field which is intended for switching of the operating modes SIMD/MIMD (signal S/M) for possible pagination of the data memory 14 of the slave processors and finally for producing, as in the case of the transfer automats 49 and 50, an end-of-computation indicator intended for the control processor $1_{N+1}$ and connected by a wire to one of its switching inputs.

Figure 7:
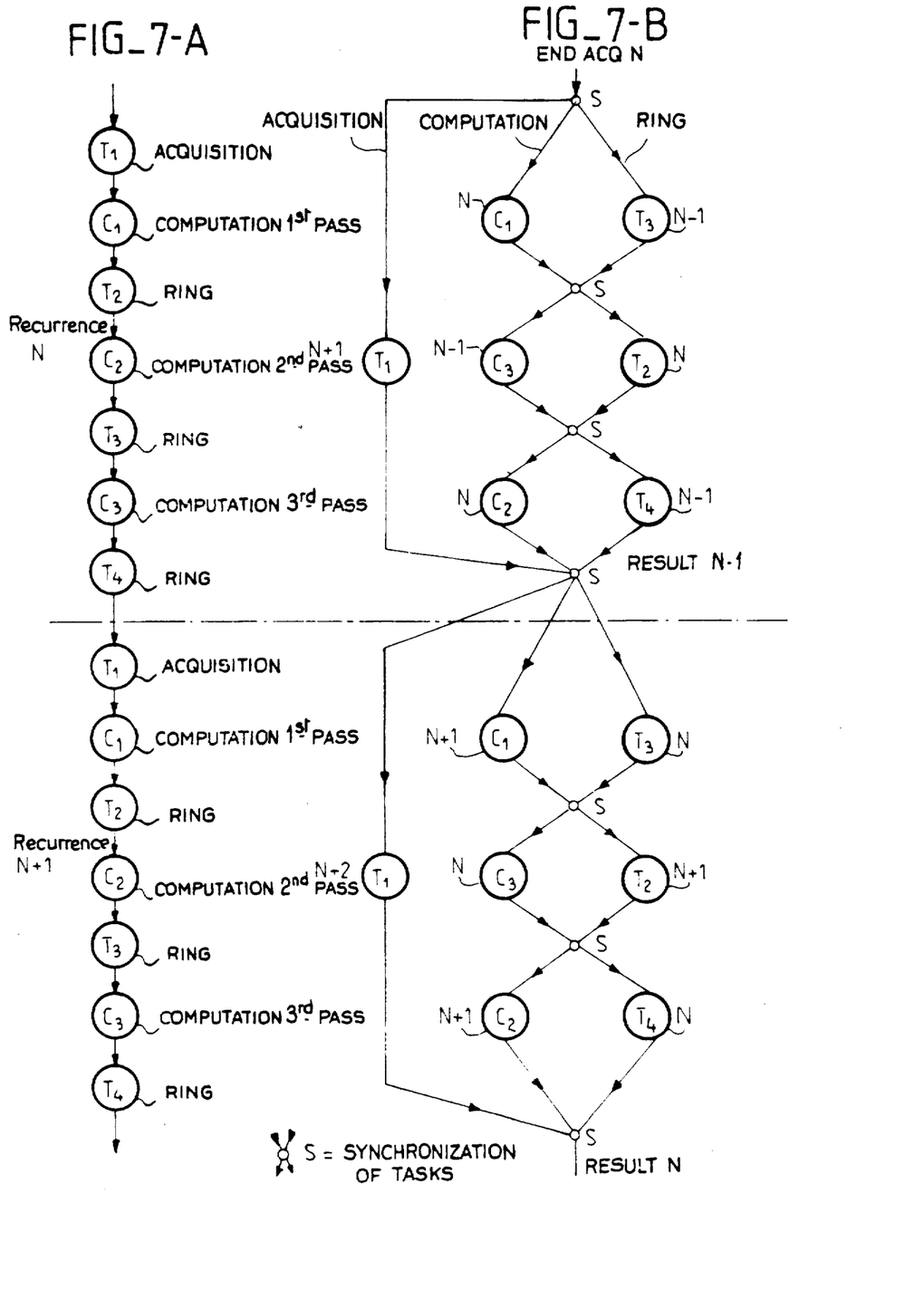
FIG. 7A shows an example of chaining of tasks commonly achieved in the calculation of a fast Fourier transform.
FIG. 7B shows the chaining of tasks of the preceding example employed with a machine in accordance with the invention.

As is apparent from FIG. 7B, many applications involve the need to initiate simultaneously a computation task by the pilot processor $1_{N+2}$ and a task of transfer on the ring bus 2 by the ring automat 50. Initiation of another pair of tasks is then governed by the end of the two preceding tasks. Thus, as shown in FIG. 5, the wiring of an AND circuit 65 makes it possible to take into account ends of ring and computation tasks in order to accelerate the response time of the pilot processor $1_{n+1}$. Activation of a new computation task is performed by a pilot task register 66 which is filled by the processor $1_{n+1}$ via the peripheral bus 4 and which contains the number of the task to be initiated. Writing of the register 66 causes switching of the pilot processor $1_{N+2}$. This latter starts the processing operation by reading on its data bus the number of the task found in the register 66.

Figure 6:
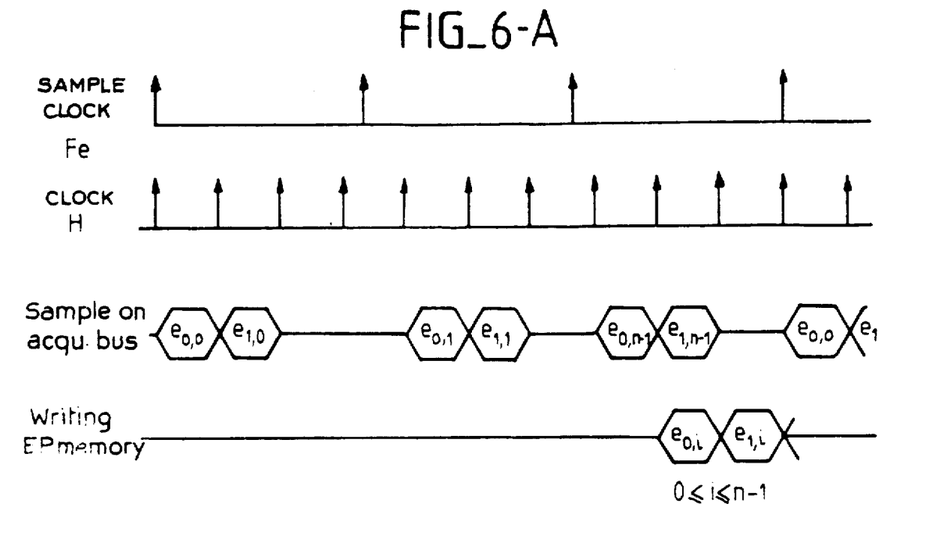
FIG. 6A is a chronogram for explaining the process of acquisition of samples in accordance with the invention.
FIG. 6B is an example of a chronogram which utilizes the time distribution of accesses to the memories of the elementary processors in accordance with the invention.

Examples of construction of sample transfers on the acquisition bus 7 and of data transfer on the ring bus 2 are shown in FIGS. 6A and 6B.

These examples correspond to the case in which the machine has k reception channels sampled synchronously at a frequency Fe. In order to ensure that the machine can carry out the required processing operations in real time both in regard to the processing operations and in regard to the data stream, it must be capable of directing all the samples to the acquisition bus 7, the output of which is lower than or equal to the rate Fc of the clock H. In the case of k channels, Fe must verify the relation:

$$Fe < \frac{Fc}{k}$$

The example of FIG. 6A corresponds solely to the case in which two reception channels are employed. Each pair of samples is transmitted successively in rotation to the different elementary slave processors $1_1$ to $1_N$.

At the first two strokes of the clock H which follow the appearance of a clock pulse having a frequency Fe, two samples are written in the buffer memory 46 of an elementary processor, whereupon the following elementary processor records the following pair of samples. When the N elementary processors each have two samples in their buffer memory 46, two memory cycles of the transfers are performed in order to write N samples at each cycle in the memories 14 of the processors while emptying the N buffer memories 46 of each processor before beginning again.

The percentage occupied time of the memory cycles reserved for transfers for the acquisition of samples is independent of the channel number. Its maximum value when Fe.k=Fc is determined by the number N of processors and has the value (100·1/N)%. The incidence of acquisition of the samples on the response time of a task performed on the ring of elementary processors $1_1$ to $1_N$ is inversely proportional to the number of processors.

By means of the buffer memory 46, the N first samples can be written in memory while the last $(e_1, N-1)$ enters the buffer memory of the elementary processor $1_N$.

One example of performance of the "ring-acquisition" transfer instructions relatively to situations of conflicts of access to the memories 14 of the processors is shown in FIG. 6B.

In order to be sure to obtain an access to the memory 14 at the required moment for the acquisition of samples which has priority, the access request for writing is anticipated by one cycle of the clock H. This is achieved by compilation of the acquisition instructions. The corresponding dialog is written in the automat of the acquisition bus 49.

This makes it possible to activate the priority circuit 60 and to allow it one cycle of the clock H to react.

In regard to the micro-instructions for transfer on the ring bus, they do not have these writing constraints. On the other hand, at the time of a theft of the cycle, all the fields of the microinstructions for transfer to the ring bus 2 must be inhibited and the clock of the sequencer of the ring automat 50 must be blocked in order to delay its execution by one cycle without advancing the ring since this would be liable to decode the items of information to be written in the memory 14.

FIG. 7A shows one example of utilization of the machine in accordance with the invention having four slave processors for chaining of the tasks in order to carry out an eight-point fast Fourier transform in accordance with the butterfly algorithm known by the designation RADIX 2 out of 8 signal samples and repetitive.

In the diagram illustrated, $T_1$ designates a first task of acquisition of samples of the signal to be processed.

$C_1$ to $C_3$ designate three tasks each corresponding to calculation of one "pass" of the fast Fourier transform.

$T_2$ to $T_4$ designate three data transfer tasks corresponding to the rearrangement performed after each pass.

$T_1$ corresponds to a transfer for acquisition of samples, $C_1$ to $C_3$ correspond to three computation tasks, $T_2$ to $T_4$ correspond to three tasks for transfer to the ring 2.

A preferential realization of this processing operation in a machine in accordance with the invention is shown in FIG. 7B. In this example, maximum use is made of the parallelism to which the machine lends itself for simultaneous processing in parallel of three tasks of different types. In the example, four elementary slave processors are employed. Each computation task $C_1$ to $C_3$ corresponds to execution in each processor of a single RADIX 2 "butterfly" and each processor has its own coefficients. This example is a typical application of operation of the machine in SIMD mode for the calculations.

The machine being dimensioned for keeping real time, the response time after arrival of the last sample is two recurrences. As indicated in FIG. 7B, this time-delay is the sum of times of computation and of transfer to the ring bus 2 which in each case cannot exceed 100% of the recurrence.

Under these conditions, the response time is short in comparison with that of a conventional MIMD machine comprising autonomous elementary processors having the same power but disposed in a pipeline chain at the rate of the recurrence. It would be necessary in this case to have two elementary processors per pass and a time-delay of three recurrences (three passes) without counting the transfers.

Maximum profitability of a machine of this type is obtained by division of the ring tasks and computation in an identical number, which is natural since transfers take place between two tasks. The time-durations of computation and ring tasks must be as closely related as possible. With each pair of tasks it is necessary to blend computation and transfer corresponding to two successive recurrences and to alternate at each initiation of pairs.

The transfer task itself is re-started only once by recurrence. It is this task which determines the rate of recurrence at the control unit 3.

What is claimed is:

1. A multiprocessor machine for signal processing of the type in which the analog signals to be processed are received from K different signal channels and converted to the form of digital samples by K analog-to-digital converters connected respectively to each channel, comprising:

N monolithic elementary signal processors, each connected by means of a sample acquisition bus common to all of the N processors, to the K sample outputs of said K analog-to-digital converters and also inter-connected to each other by way of a ring bus common to all of the N processors so as to permit circulation between each of said N processors of the results of computation performed on the samples received by each processor;

a control unit for controlling accesses to and from said N processors and for controlling the performance of computations to be carried out by said N processors on the samples received by them as well as the transfer of samples on the acquisition bus; and at least one transfer automat means synchronized by a common clock signal for controlling the transfer of the computation results between processors on the ring bus, said each processor comprising a computation unit and a program memory wherein the computation unit is for carrying out indifferently tasks of computation in the single instruction multiple data (SIMD) or multiple instruction multiple data (MIMD) mode under the control of an instruction derived from the unit for control of instructions contained in its own program memory (MIMD mode) or from instructions supplied by the control unit (SIMD mode)

and wherein each processor further comprises:

a data memory; and a memory interface circuit for coupling the data memory either to the computation unit or to the ring bus.

2. A machine according to claim 1, wherein the transfer automat means comprises:

a first automat and a second automat for transmitting on a transfer microinstruction bus which is common to all of the processors control micro-instructions;

wherein said first automat is for controlling the transfer of samples to the acquisition bus and said second automat is for controlling an interprocessor transfer of data on said ring bus.

3. A machine according to claim 2, wherein the transfer automat means further comprises:

a priority circuit which initiates blocking of the second automat when a transfer of samples is to be made on said acquisition bus.

4. A machine according to claim 3, wherein the control unit comprises:

a pilot processor and a control processor having structures which are similar to those of the N elementary signal processors disposed on the ring, the pilot and control processors being connected to each other and to the ring bus by means of an internal interface circuit.

5. A machine according to claim 4, wherein each elementary processor is capable of performing in parallel and independently of any other tasks being performed by the other processors of the machine a task of computation in the MIMD mode or in the SIMD mode, a task of acquisition of data on the acquisition bus or else a task of transfer on the ring bus, the computation tasks being performed sequentially under the control of the pilot processor, the acquisition and transfer tasks being carried out sequentially under the control respectively of the first and second automat, with the assignment of the tasks being performed by the control processor.

6. A machine according to claim 5, wherein the format of each micro-instruction for control of a transfer on the acquisition bus comprises at least a first source field for indicating the analog-to-digital converter employed, a second field for indicating a group of elementary processors concerned by the transfer, a third address field for access to the memory of the elementary processor concerned, and a fourth field for indicating a write access of the elementary processor concerned; and wherein the format of each micro-instruction for control of a transfer on the ring bus comprises at least one fifth field indicative of any activity on the ring for performing the operation in a first direction or in a second direction, a sixth field for indicating the source or the destination of the transfer according to the direction of transfer and for indicating the group of elementary processors concerned, a seventh field which is made active, at the time of writing or reading in the memory of the elementary processor concerned so as to indicate such reading or writing activity, an eighth field for writing/reading which indicates the type of access to the memory of the elementary processor concerned, the assembly of fields being concatenated in order to form a single micro-instruction and to permit particularization of the sub-groups of elementary processors for transfer on the ring and acquisition on the bus in order to permit processing of signal;

wherein the processing algorithms for the processors are symmetrical.

* * * * *